United States Patent [19]

Willenberg et al.

[11] 4,428,920

[45] Jan. 31, 1984

[54] PROCESS OF PRODUCING POTASSIUM TETRAFLUORO ALUMINATE

[75] Inventors: Heinrich Willenberg, Garbsen; Karl-Heinz Hellberg; Heinz Zschiesche, both of Hanover, all of Fed. Rep. of Germany

[73] Assignee: Kali-Chemie Aktiengesellschaft, Hanover, Fed. Rep. of Germany

[21] Appl. No.: 368,840

[22] Filed: Apr. 15, 1982

[30] Foreign Application Priority Data

Apr. 25, 1981 [DE] Fed. Rep. of Germany ....... 3116469

[51] Int. Cl.$^3$ ............................. C01F 7/54; C01F 7/04
[52] U.S. Cl. ..................................... 423/465; 423/116
[58] Field of Search ................ 423/464, 465, 116, 126

[56] References Cited

PUBLICATIONS

Mellor, *Inorganic and Theoretical Chemistry*, vol. V, (1946), Longmans, Green & Co., pp. 306, 307
Phillips et al., Journal of the American Ceramic Soc. vol. 49, No. 2, pp. 631-634, Dec. 1966.
Equilibria in $KAlF_4$-Containing Systems, p. 633, Dec. 1966.
Chemical Abstract, vol. 84, 1976 p. 296, No. 84:78453d
*Electric and Magnetic Phenomena*, vol. 56, 1962 "Fluoroaluminates as Dielectrics".

Primary Examiner—Helen M. McCarthy
Assistant Examiner—Steven Capella
Attorney, Agent, or Firm—Schwartz, Jeffery, Schwaab, Mack, Blumenthal & Koch

[57] ABSTRACT

Potassium tetrafluoro aluminate of a melting point not exceeding 575° C. is produced by reacting an aqueous solution of fluoro aluminum acid with an aqueous solution of a potassium compound, especially of potassium hydroxide, the amount of potassium in said solution being less than the stoichiometrically required amount.

14 Claims, No Drawings

PROCESS OF PRODUCING POTASSIUM TETRAFLUORO ALUMINATE

BACKGROUND OF THE INVENTION

(1) Field of the Invention

The present invention relates to a simple and advantageous process of producing potassium tetrafluoro aluminate and more particularly to a process of producing potassium tetrafluoro aluminate of a melting point not exceeding 575° C.

(2) Description of the Prior Art

The conventional technical methods of producing potassium tetrafluoro aluminate comprise reacting the hydrate of alumina, hydrofluoric acid, and potassium hydroxide. After separating the solid reaction product from the mother liquor, there is obtained a reaction product which does not melt below 620° C. Such a product can be used only for certain specific purposes. In order to increase the yield when proceeding according to the known processes, the potassium hydroxide is usually added in an excess up to about 20% of the theoretically required amount. Thereby, however, no substantial change in the melting point of the reaction product is achieved.

It is possible to produce potassium tetrafluoro aluminate of a lower melting point by concentrating by evaporation a suspension obtained by combining stoichiometric amounts of the reaction components. This process, however, is very expensive due to the high energy requirements.

Another technical process of producing potassium tetrafluoro aluminate which melts below 575° C. without any unmelted residue, consists in melting together comminuted potassium fluoride and aluminum fluoride at a temperature above 600° C. and grinding the resulting solidified melt. This process also demands high energy requirements. Moreover, the resulting reaction product frequently contains undesirable impurities.

SUMMARY OF THE INVENTION

It is one object of the present invention to provide a simple, advantageous, and effective process of producing potassium tetrafluoro aluminate having a melting point not exceeding 575° C. and completely melting at said temperature without any unmelted residue. Said process overcomes the above mentioned disadvantages of the known processes.

Other objects of the present invention and advantageous features thereof will become apparent as the description proceeds.

In principle the process according to the present invention of producing a potassium tetrafluoro aluminate of a melting point not exceeding 575° C. comprises the steps of reacting an aqueous solution of fluoro aluminum acid with an amount of an aqueous solution of a potassium compound which is less than the stoichiometrically required amount calculated with respect to the total charge, if desired, subjecting the resulting reaction mixture to an after-treatment to complete formation of the potassium tetrafluoro aluminate, and subjecting the resulting suspension to a separation operation to recover and isolate the potassium tetrafluoro aluminate.

By investigations regarding melting point equilibria (see, for instance, B. Phillips. C. M. Warshaw, and J. Mockrin in "Journ. Amer. Ceram. Soc." vol. 49 (1966), p. 631) it appears to be proven that solid phases of the composition of 50 mole percent of potassium fluoride and 50 mole percent of aluminum fluoride contain the compound of the formula $KAlF_4$ which melts at 574° C. and which forms with potassium aluminum fluoride of the formula $K_3AlF_6$ a eutectic mixture melting at about 560° C. The designation of the compound produced according to the present invention as "potassium tetrafluoro aluminate of a melting point not exceeding 575° C." as used herein and in the claims annexed hereto, comprises pure potassium tetrafluoro aluminate of the formula $KAlF_4$ as well as its mixtures with potassium aluminum fluoride of the formula $K_3AlF_6$ and/or aluminum fluoride of the formula $AlF_3$, provided the mixtures have a melting point not exceeding 575° C. Said mixtures contain between about 43 mole percent and up to 50 mole percent of aluminum fluoride of the formula $AlF_3$, while the remainder is potassium fluoride of the formula $KF$.

Insofar as the data derived from the melting point diagrams can be applied to aqueous systems, one could assume that optimum results would be achieved with charges containing equimolecular amounts of potassium and aluminum or containing an excess of potassium. When reacting fluoro aluminum acid with a potassium compound, there is obtained, however, no satisfactory product by using equimolecular amounts of the reactants. Surprisingly and in contrast to expectations, however, there is produced a reaction product with a melting point not exceeding 575° C., when charging the potassium reactant in an amount of less than the stoichiometric amount calculated with respect to the total charge. According to the present invention, the preferred molar ratio with respect to the total charge is a molar ratio of potassium to aluminum within the range between 0.60:1 and 0.95:1 and most advantageously a molar ratio between 0.80:1 and 0.90:1.

It is also of advantage to freshly prepare the fluoro aluminum acid each time from hydrofluoric acid and the hydrate of alumina. Preferably a fluoro aluminum acid of a concentration of 5%, by weight, to 30%, by weight, and more particularly of a concentration between 15%, by weight, and 25%, by weight, is used in the reaction.

According to a further advantageous variant of the process of the present invention, the fluoro aluminum acid contains an excess of fluorine. Preferably the proportion of fluorine to aluminum is within the range of 4.0:1 and 4.8:1 and more particularly within the range of 4.0:1 and 4.4:1.

An aqueous potassium hydroxide solution of a concentration between 2%, by weight, and 25%, by weight, and more advantageously between 10%, by weight, and 20%, by weight, is preferably used for the reaction with the fluoro aluminum acid. In accordance with a variant of the process according to the present invention, part of the potassium hydroxide can be replaced by other potassium compounds, more particularly by potassium chloride. The molar ratio of potassium chloride to potassium hydroxide in the aqueous solution must be below a ratio of 3.0:1 in order to achieve satisfactory results. Other possible potassium compounds are e.g. the carbonate, bromide, sulphate.

The reaction can be carried out at a temperature within the range between room temperature and the boiling point of the reaction mixture. The preferred temperatures, however, are those between 70° C. and 90° C. In this case it has been provided to be especially economical to produce the solutions of the reactants immediately before the reaction takes place and to mix the resulting reactant solutions without any intermediate cooling so as to make use of the solution enthalpy.

The mode in which the reaction product is precipitated can principally be carried out in any desired manner. However, it has been proved that, on batchwise reaction, the fluoro aluminum acid is preferably placed first into the reaction vessel and that then the solution of the potassium compound is added thereto. When carrying out the process in continuous operation, it is of advantage, for reasons of economy, to introduce both reactant solutions simultaneously into the reaction vessel.

The reactants are mixed with each other within a period of time from twelve minutes to two hours. During said mixing the reaction solution is preferably stirred and the reaction temperature is kept substantially constant. To complete the reaction it is advisable to subsequently continue stirring of the reaction mixture for about the same period of time. Thereby the reaction temperature can be maintained at its initial value by supplying additionaal heat. However, according to a preferred variant of the process of the present invention, no further heat need be supplied during said after-reaction phase. For separating the solid reaction product from the liquid phase there can be used all conventional filtration and centrifugal separation procedures.

When maintaining the procedural conditions according to the present invention as described hereinabove, there is obtained a potassium tetrafluoro aluminate which melts without any solid residue at a temperature not exceeding 575° C. in a good yield, for instance, in a yield of 97% calculated with respect to potassium and of 84% calculated with respect to fluorine.

The resulting reaction product according to the present invention has provided to be useful, for instance, as active filler material in abrasive agents or as an auxiliary agent in the metallurgical field as well as in the manufacture of glass.

DESCRIPTION OF THE PREFERRED EMBODIMENTS

The following Examples serve to illustrate more in detail the process according to the present invention without, however, being limited thereto. They refer to the production of two moles of potassium tetrafluoro aluminate. The melting points of the reaction products dried at a temperature of 120° C. are determined in a calibrated muffle furnace and by means of differential thermoanalysis.

EXAMPLES 1 TO 8

The conditions under which the Examples are carried out are shown in the attached Table. In Examples 1 to 7 an aqueous potassium hydroxide solution, which in Examples 4 and 5 contains potassium chloride, is gradually added at 80° C. to an aqueous solution of fluoro aluminum acid within about one hour while stirring. The concentration of the reactant solutions in percent, by weight, and the ratios of fluorine to aluminum in the fluoro aluminum acid solution, of potassium chloride to potassium hydroxide in the potassium hydroxide reactant solution, and of potassium to aluminum in the total charge are given in said Table. Stirring of the reaction mixture is continued for half an hour without further heating. The resulting precipitated reaction product is filtered off and the filter residue is dried. The characteristic data and properties of the resulting reaction products, such as their melting points and the ratios of potassium to aluminum and of fluorine to aluminum as well as the yields calculated with respect to potassium and fluorine are also given in said Table.

In contrast to Examples 1 to 7 both reactants are introduced simultaneously into the reaction vessel when proceding according to Example 8. For completion of the reaction, the reaction mixture is transferred from the first reaction vessel into a second reaction vessel in such a manner that the height to which the reaction mixture is filled in the first reaction vessel fluctuates between 90% and 100%. After an average residence time of about half an hour in the second reaction vessel, the reaction mixture is continuously passed to the filtration apparatus. The filter residue is then worked up in the same manner as described in the other Examples. It is evident that there are only minimum differences in the melting points and ratios of the reaction product obtained in batch operation according to Example 1 and the reaction product obtained according to the continuous process of Example 8.

As is evident, Examples 5 and 7 are given as comparative Examples of processes which are not carried out according to the present invention.

It may be mentioned that the ratios as shown in the Table, i.e. the ratios of:
F/Al in the fluoro aluminum acid,
KCl/KOH in the potassium hydroxide solution,
K/Al in the total charge,
K/Al in the resulting potassium tetrafluoro aluminate, and
F/Al in the resulting potassium tetrafluoro aluminate, are molar ratios.

Of course, many changes and variations in the reaction conditions, temperature, and duration, in the composition and concentration of the reactant solutions, in the amount of potassium chloride in the potassium hydroxide solution, in the manner in which the reaction products are recovered from the reaction mixture and are worked up to the final solid potassium tetrafluoro aluminate, and the like, may be made by those skilled in the art in accordance with the principles set forth herein and in the claims annexed hereto.

TABLE

| Example No. | Reactants used ||||| Reaction Product ||| Yield in % ||
|---|---|---|---|---|---|---|---|---|---|---|
| | HAlF$_4$ || KOH ||| | | | | |
| | Conc. % by weight | F/Al | Concentr. in % by weight | KCl/KOH | K/Al | M.P. °C. | K/Al | F/Al | Calcul. for K | Calculated for F |
| 1 | 21 | 4.4 | 10 | 0 | 0.80 | 570 | 1.10 | 4.15 | 97 | 68 |
| 2 | 21 | 4.0 | 10 | 0 | 0.90 | 570 | 1.16 | 4.12 | 97 | 84 |
| 3 | 21 | 4.4 | 10 | 0 | 0.90 | 570 | 1.11 | 4.22 | 98 | 79 |
| 4 | 21 | 4.2 | 5 | 1.0 | 0.90 | 572 | 1.10 | 4.16 | 96 | 79 |
| 5 | 21 | 4.2 | 2.5 | 3.0 | 0.90 | 590$^{(x)}$ | 0.95 | 3.98 | 80 | 72 |

TABLE-continued

| Example No. | Reactants used | | | | | | Reaction Product | | | Yield in % | |
|---|---|---|---|---|---|---|---|---|---|---|---|
| | HAlF₄ | | KOH | | | | | | | | |
| | Conc. % by weight | F/Al | Concentr. in % by weight | KCl/KOH | K/Al | | M.P. °C. | K/Al | F/Al | Calcul. for K | Calculated for F |
| 6 | 21 | 4.2 | 20 | 0 | 0.90 | | 575 | 1.17 | 3.83 | 99 | 69 |
| 7 | 21 | 4.2 | 15 | 0 | 1.0 | | 585⁽ˣ⁾ | 1.28 | 4.33 | 89 | 77 |
| 8 | 21 | 4.0 | 10 | 0 | 0.90 | | 572 | 1.18 | 4.27 | 93 | 76 |

⁽ˣ⁾Reaction product starts to melt

What is claimed is:

1. A process for producing potassium tetrafluoro aluminate having a melting point not exceeding about 575° C., comprising the steps of:
   reacting an aqueous solution of fluoro aluminum acid with an amount of an aqueous solution of a potassium compound which is less than the stoichiometrically required amount calculated with respect to the total charge of reactants to produce a suspension of potassium tetrafluoro aluminate; and
   separating the potassium tetrafluoro aluminate from the resulting suspension.

2. A process according to claim 1, wherein the reaction step comprises adding said aqueous solution of potassium compound to said fluoro aluminum acid during a first period of time with agitation and continuing agitation for a second period of time after said addition is complete.

3. A process according to claim 1, wherein the molar ratio of potassium to aluminum in the total charge of reactants is within the range of from about 0.6:1 to 0.95:1.

4. A process according to claim 3, wherein the molar ratio of potassium to aluminum is within the range of from about 0.8:1 to 0.9:1.

5. A process according to claim 1, wherein the fluoro aluminum acid reactant has a concentration between about 5% by weight and 30% by weight.

6. A process according to claim 5, wherein the concentration of the fluoro aluminum acid is between about 15% by weight and 25% by weight.

7. A process according to claim 1, wherein the fluoro aluminum acid has a molar ratio of fluorine to aluminum within the range of from about 4:1 to 4.8:1.

8. A process according to claim 7, wherein the fluoro aluminum acid has a molar ratio of fluorine to aluminum within the range of from about 4:1 to 4.4:1.

9. A process according to claim 1 or 2, wherein the reaction is carried out at a temperature within the range between about room temperature and the boiling point of the reaction mixture.

10. A process according to claim 9, wherein the reaction is carried out at a temperature within the range between about 70° C. and 90° C.

11. A process according to claim 2, wherein no heat is supplied to the reaction mixture during the second period of time.

12. A process for producing potassium tetrafluoro aluminate having a melting point not exceeding about 575° C., comprising the steps of:
   reacting an aqueous solution of fluoro aluminum acid with an amount of an aqueous solution of a potassium compound comprising potassium hydroxide having a concentration between about 2% by weight and 25% by weight which is less than the stoichiometrically required amount calculated with respect to the total charge of reactants to produce a suspension of potassium tetrafluoro aluminate; and
   separating the potassium tetrafluoro aluminate from the resulting suspension.

13. A process according to claim 12 wherein the concentration of the aqueous potassium hydroxide solution is between about 10% by weight and 20% by weight.

14. A process according to claim 12, wherein part of the potassium hydroxide in the aqueous solution of the potassium compound reactant is replaced by potassium chloride in an amount corresponding to a molar ratio of potassium chloride to potassium hydroxide being lower than a ratio of about 3:1.

* * * * *